United States Patent
Kim et al.

(10) Patent No.: US 11,855,259 B2
(45) Date of Patent: Dec. 26, 2023

(54) ELECTROLYTE FOR LITHIUM SECONDARY BATTERY AND LITHIUM SECONDARY BATTERY COMPRISING SAME

(71) Applicants: RENEWABLE ENERGY PLATFORM CO., LTD., Chungcheongnam-do (KR); THE INDUSTRY & ACADEMIC COOPERATION IN CHUNGNAM NATIONAL UNIVERSITY, Daejeon (KR)

(72) Inventors: Hee Cheol Kim, Cheonan-si (KR); Younggil Kwon, Daejeon (KR); Eui Hyeong Hwang, Daejeon (KR); Ji Hee Jang, Daejeon (KR); Sang Ho Lee, Daejeon (KR); Seung Wan Song, Sejong (KR); Quang Hieu Pham, Würenlingen (CH)

(73) Assignees: RENEWABLE ENERGY PLATFORM CO., LTD., Chungcheongnam-Do (KR); THE INDUSTRY & ACADEMIC COOPERATION IN CHUNGNAM NATIONAL UNIVERSITY, Daejeon (KR)

( * ) Notice: Subject to any disclaimer, the term of this patent is extended or adjusted under 35 U.S.C. 154(b) by 304 days.

(21) Appl. No.: 16/640,912

(22) PCT Filed: Jul. 31, 2018

(86) PCT No.: PCT/KR2018/008729
§ 371 (c)(1),
(2) Date: Feb. 21, 2020

(87) PCT Pub. No.: WO2019/039763
PCT Pub. Date: Feb. 28, 2019

(65) Prior Publication Data
US 2021/0135285 A1    May 6, 2021

(30) Foreign Application Priority Data

Aug. 22, 2017 (KR) .................. 10-2017-0106261

(51) Int. Cl.
*H01M 10/0567* (2010.01)
*H01M 10/0568* (2010.01)
(Continued)

(52) U.S. Cl.
CPC ... *H01M 10/0567* (2013.01); *H01M 10/0525* (2013.01); *H01M 10/0568* (2013.01); *H01M 10/4235* (2013.01); *H01M 2300/0025* (2013.01)

(58) Field of Classification Search
None
See application file for complete search history.

(56) References Cited

U.S. PATENT DOCUMENTS

| | | | | |
|---|---|---|---|---|
| 2010/0003597 A1* | 1/2010 | Tsunashima | ...... | H01M 10/0568 429/188 |
| 2013/0029231 A1* | 1/2013 | Jeon | ............ | H01M 10/0569 429/331 |
| 2016/0315354 A1* | 10/2016 | Okada | ............ | H01M 4/587 |

FOREIGN PATENT DOCUMENTS

| | | | |
|---|---|---|---|
| JP | H08298134 | * | 11/1996 |
| JP | H10144346 | * | 5/1998 |

(Continued)

OTHER PUBLICATIONS

Pham et al. J. Electrochem. Soc., 161 (14) A2002-A2011 (2014) (Year: 2014).*
WIPO, International Search Report dated Nov. 1, 2018.

*Primary Examiner* — Lisa S Park
(74) *Attorney, Agent, or Firm* — Li & Cai Intellectual Property (USA) Office (57) ABSTRACT

The present invention relates to a lithium secondary battery electrolyte and a lithium secondary battery including the same and, more specifically, to a flame retardant or non- (Continued)

flammable lithium secondary battery electrolyte having excellent stability even at a high voltage and a lithium secondary battery including the same.

12 Claims, 3 Drawing Sheets

(51) Int. Cl.
  *H01M 10/0525* (2010.01)
  *H01M 10/42* (2006.01)

(56) References Cited

FOREIGN PATENT DOCUMENTS

| | | |
|---|---|---|
| JP | 2016-027530 A | 2/2016 |
| KR | 10-2007-0019965 A | 2/2007 |
| KR | 10-2009-0027574 A | 3/2009 |
| KR | 10-2013-0100595 A | 9/2013 |
| KR | 10-2014-0034179 A | 3/2014 |
| KR | 10-2014-0116078 A | 10/2014 |

* cited by examiner

ELECTROLYTE FOR LITHIUM SECONDARY BATTERY AND LITHIUM SECONDARY BATTERY COMPRISING SAME

BACKGROUND OF THE INVENTION

Field of the Invention

The present invention relates to a lithium secondary battery electrolyte and a lithium secondary battery including the same and, more specifically, to a flame retardant or nonflammable lithium secondary battery electrolyte having excellent stability even at a high voltage and a lithium secondary battery including the same.

Related Art

Recently, accompanied by rapid supply of information-related devices including a personal computer, a video camera, a cellular phone and others, batteries used as power sources of the information-related devices have actively been developed. Further, developments of high-output and high-capacity batteries for electric vehicles or hybrid vehicles have been conducted in the automobile industry. A lithium battery among various batteries has a merit of a high energy density.

A lithium ion battery has merits that it has light weight, small volume, high operating voltage, high energy density, large output power and high charging efficiency, does not have a memory effect, and has a long lifetime compared to other batteries. Therefore, the lithium ion battery has widely been applied to a digital product field including a cellular phone, a notebook computer and others, and has been considered as one of best options for electric vehicles and large energy storage devices.

However, as demands for battery energy densities of digital products such as a smartphone, a tablet PC and the like have currently been increasingly higher, commercial lithium ion batteries do not satisfy the demands.

The most effective method capable of improving energy density of a lithium ion battery is to use a high capacity cathode material or a high voltage cathode material. However, according as a cathode material charging voltage is improved, and an oxidative decomposition phenomenon of an electrolyte is deteriorated at the same time in a high voltage battery, performance of the battery is deteriorated. Moreover, a cathode metal ion emission phenomenon is existed in a process of generally using the high voltage battery, and particularly when the battery is stored at a high temperature for a long time, emission of cathode metal ions is further deteriorated such that capacity retention rate of the battery is also lowered.

Defect problems in high-temperature circulation and high-storage performance generally existing in a currently commercialized lithium cobalt oxide high voltage battery of 4.3 V or higher are mainly points that thickness expansion and internal resistance increase after high-temperature circulation are relatively large, and the battery has a low capacity retention rate when the battery is stored at a high temperature for a long time.

Main factors causing these problems are as follows. (1) Oxidative decomposition of an electrolyte. As oxidation activity of a cathode active material is relatively high under a high voltage, reactivity between the cathode active material and the electrolyte is increased, and when a high temperature is added to the electrolyte, a reaction between a high voltage cathode and the electrolyte is further deteriorated such that an oxidative decomposition product of the electrolyte is constantly deposited on the surface of the cathode, and surface properties of the cathode are deteriorated to continuously increase internal resistance and thickness of the battery. (2) Emission and reduction of metal ions of a cathode active material. As decomposition of $LiPF_6$ in the electrolyte is very easy under high temperatures, HF and PFs are generated. HF out of HF and PFs corrodes the cathode to emit metal ions such that capacity is lost by destroying structure of a cathode material. On the other hand, according as the electrolyte is easily oxidized on the cathode, and metal ions of the cathode active material are easily reduced and emitted into the electrolyte under a high voltage such that capacity is lost by destroying structure of a cathode material. Simultaneously, according as the metal ions emitted into the electrolyte are reduced into a metal simple substance by easily passing through an SEI and obtaining electrons from an anode such that an SEI structure is destroyed to continuously increase anode resistance, self-discharge of the battery is deteriorated, irreversible capacity is increased, and performance is deteriorated.

In a secondary lithium battery, e.g., a lithium ion battery, an organic carbonate, ester and an ionic liquid are used as a polar solvent. Lately, the lithium ion battery includes a mixture of different organic aprotic solvents that are not a single solvent. As these organic solvents tend to be combustible, serious safety for use of the lithium ion battery is apprehended.

A possibility of reducing combustibility of an electrolyte composition comprised of the organic aprotic solvents is addition of flame-retardant additives, e.g., fluorinated alkylphosphates (Literature [K. Xu, S. S. Zhang, J. L. Allen, T. R. Jow, Journal of the Electrochemical Society 2002, 149 A1079-A1082]), trialkylphosphonates (Literature [S. Dalavi, M. Q. Xu, B. Ravdel, L. Zhou, B. L. Lucht, Journal of the Electrochemical Society 2010, 157 A1113-A1120]), or alkylphosphates and phosphazenes (Literature [K. Xu, M. S. Ding, S. S. Zhang, J. L. Allen, T. R. Jow, Journal of the Electrochemical Society 2002, 149 A622-A626]).

SUMMARY OF THE INVENTION

In order to solve the above-mentioned problems of the prior art, an objective of the present invention is to provide a lithium ion battery electrolyte which is excellent in stability and high temperature performance under a high voltage and has improved overall performance by providing an organic solvent with noninflammability.

Furthermore, the other objective of the present invention is to provide a high voltage lithium ion battery including a high voltage lithium ion battery electrolyte according to the present invention.

A flame retardant or nonflammable lithium secondary battery electrolyte according to an embodiment of the present invention comprises at least one compound of a fluoro carbonate compound represented by the following chemical formula 1 or a fluoro ester compound represented by the following chemical formula 2, and further comprises a cyclic carbonate compound represented by the following chemical formula 3:

<Chemical Formula 1>

In chemical formula 1, $R_1$ and $R_2$ are each independently hydrogen, fluoro or $CH_xF_{(3-x)}$ (x is 0, 1, 2, or 3), hydrogens connected to the carbon Ca and carbon Cb may be each independently substituted with fluoro, an $C_1$-$C_3$ alkyl group, or a $C_1$-$C_3$ fluoroalkyl group, and n is 1, 2, or 3, and includes at least one fluoro;

<Chemical Formula 2>

In chemical formula 2, $R_1$ and $R_2$ are each independently hydrogen, fluoro or $CH_xF_{(3-x)}$ (x is 0, 1, 2, or 3), hydrogens connected to the carbon Ca and carbon Cb may each independently substituted with fluoro, an $C_1$-$C_3$ alkyl group, or a $C_1$-$C_3$ fluoroalkyl group, and n is 1, 2, or 3, and includes at least one fluoro; and <Chemical Formula 3>

In chemical formula 3, $R_1$ and $R_2$ are each independently hydrogen or a $C_1$-$C_4$ alkyl group.

In a flame retardant or nonflammable lithium secondary battery electrolyte according to an embodiment of the present invention, when the flame retardant lithium secondary battery electrolyte comprises the fluoro carbonate compound represented by the above-mentioned chemical formula 1 and the cyclic carbonate compound represented by the above-mentioned chemical formula 3, the fluoro carbonate compound represented by the above-mentioned chemical formula 1 and the cyclic carbonate compound represented by the above-mentioned chemical formula 3 may be mixed at a volume ratio of 0.5:9.5 to 9.5:0.5. Further, the fluoro carbonate compound represented by the above-mentioned chemical formula 1 and the cyclic carbonate compound represented by the above-mentioned chemical formula 3 may be mixed more preferably at a volume ratio of 1:9 to 9:1, 3:7 to 7:3, or 5:5.

Further, when the flame retardant lithium secondary battery electrolyte comprises the fluoro ester compound represented by the above-mentioned chemical formula 2 and the cyclic carbonate compound represented by the above-mentioned chemical formula 3, the fluoro ester compound represented by the above-mentioned chemical formula 2 and the cyclic carbonate compound represented by the above-mentioned chemical formula 3 may be mixed at a volume ratio of 0.5:9.5 to 9.5:0.5. Further, the fluoro ester compound represented by the above-mentioned chemical formula 2 and the cyclic carbonate compound represented by the above-mentioned chemical formula 3 may be mixed more preferably at a volume ratio of 1:9 to 9:1, 3:7 to 7:3, or 5:5.

Further, when the flame retardant lithium secondary battery electrolyte comprises the fluoro carbonate compound represented by the above-mentioned chemical formula 1, the fluoro ester compound represented by the above-mentioned chemical formula 2, and the cyclic carbonate compound represented by the above-mentioned chemical formula 3, a mixture of the fluoro carbonate compound represented by the above-mentioned chemical formula 1 and the fluoro ester compound represented by the above-mentioned chemical formula 2, and the cyclic carbonate compound represented by the above-mentioned chemical formula 3 may be mixed at a volume ratio of 0.5:9.5 to 9.5:0.5. Further, the mixture of the fluoro carbonate compound represented by the above-mentioned chemical formula 1 and the fluoro ester compound represented by the above-mentioned chemical formula 2, and the cyclic carbonate compound represented by the above-mentioned chemical formula 3 may be mixed more preferably at a volume ratio of 1:9 to 9:1, 3:7 to 7:3, or 5:5.

In a flame retardant or nonflammable lithium secondary battery electrolyte according to an embodiment of the present invention, the fluoro carbonate compound represented by the above-mentioned chemical formula 1 may be di-2,2,2-trifluoroethylcarbonate.

A flame retardant or nonflammable lithium secondary battery electrolyte according to an embodiment of the present invention may have a discharge capacity of 170 mAhg$^{-1}$ or more after 100 charge and discharge cycles at a charge cut-off voltage of 4.3 V or more. More preferably, a flame retardant or nonflammable lithium secondary battery electrolyte according to an embodiment of the present invention may have a discharge capacity of 170 mAhg$^{-1}$ or more after 100 charge and discharge cycles at a charge cut-off voltage of 4.5 V or more, 4.7 V or more, or 4.9 V or more.

A flame retardant or nonflammable lithium secondary battery electrolyte according to an embodiment of the present invention may further comprise a lithium salt including any one or mixtures of two or more selected from the group consisting of LiPF$_6$, LiClO$_4$, LiAsF$_6$, LiBF$_4$, LiSbF$_6$, LiAlO$_4$, LiAlCl$_4$, LiCF$_3$SO$_3$, LiC$_4$F$_9$SO$_3$, LiN(C$_2$F$_5$SO$_3$)$_2$, LiN(C$_2$F$_5$SO$_2$)$_2$, LiN(CF$_3$SO$_2$)$_2$, LiN(C$_x$F$_{2x+1}$SO$_2$)(C$_y$F$_{2y+1}$SO$_2$)(provided that x and y are 0 or natural number), LiCl, LiI, LiSCN, LiB(C$_2$O$_4$)$_2$, LiF$_2$BC$_2$O$_4$, LiPF$_4$(C$_2$O$_4$), LiPF$_2$(C$_2$O$_4$)$_2$, and LiP(C$_2$O$_4$)$_3$.

In a flame retardant or nonflammable lithium secondary battery electrolyte according to an embodiment of the present invention, the lithium salt may have a concentration of 0.1 to 6.0 M.

In a flame retardant or nonflammable lithium secondary battery electrolyte according to an embodiment of the present invention, the lithium salt may be mixed with the fluoro ester compound represented by the above-mentioned chemical formula 2 at a volume ratio of 20 to 80:100. Further, the lithium salt may be mixed with the fluoro ester compound represented by the above-mentioned chemical formula 2 at a volume ratio of more preferably 40:100, or 60:100.

In a flame retardant or nonflammable lithium secondary battery electrolyte according to an embodiment of the present invention, the lithium salt may be mixed with the cyclic carbonate compound represented by the above-mentioned chemical formula 3 at a volume ratio of 20 to 80:100. Further, the lithium salt may be mixed with the cyclic carbonate compound represented by the above-mentioned chemical formula 3 at a volume ratio of more preferably 40:100, or 60:100.

A flame retardant or nonflammable lithium secondary battery electrolyte according to an embodiment of the present invention may have 20 sg$^{-1}$ or less of a self-extinguishing time (SET) which means a second unit time per weight of the electrolyte taken from removal of the implement to extinguishing of the electrolyte after lighting the flame retardant or nonflammable lithium secondary battery electrolyte by using an implement.

A flame retardant or nonflammable lithium secondary battery electrolyte according to an embodiment of the present invention may have less than 6 sg$^{-1}$ of a self-extinguishing time (SET) which means a second unit time per weight of the electrolyte taken from removal of the implement to extinguishing of the electrolyte after lighting the flame retardant or nonflammable lithium secondary battery electrolyte by using an implement.

A flame retardant or nonflammable lithium secondary battery electrolyte according to an embodiment of the present invention may have a flash point of 150° C. or more. Further, a flame retardant or nonflammable lithium secondary battery electrolyte according to an embodiment of the present invention may have a flash point of more preferably 180° C. or more, or 200° C. or more.

A lithium secondary battery according to an embodiment of the present invention may include the flame retardant or nonflammable lithium secondary battery electrolyte.

A lithium secondary battery according to an embodiment of the present invention may have a charge cut-off voltage of 4.0 to 6.0 V.

A lithium secondary battery to which a flame retardant or nonflammable lithium secondary battery electrolyte according to an embodiment of the present invention is applied may additionally include any one or more cathode active materials of $LiCoO_2$, $LiNi_xCo_yMn_zL_{(1-x-y-z)}O_2$ (L is any one of Al, Sr, Mg, Ti, Nb, V, Ca, Zr, Zn, Sn, Si or Fe, $0 \leq x \leq 1$, $0 \leq y \leq 1$, $0 \leq z \leq 1$, and $x+y+z \leq 1$), $LiNi_xCo_yAl_zL_{(1-x-y-z)}O_2$ (L is any one of Al, Sr, Mg, Ti, Nb, Ca, Zr, Zn, Sn, Si or Fe, $0 \leq x \leq 1$, $0 \leq y \leq 1$, $0 \leq z \leq 1$, and $x+y+z \leq 1$), $wLi_2MnO_3 \cdot (1-w)LiMn_aNi_bCo_cL_{(1-a-b-c)}O_2$ (L is any one of Al, Sr, Mg, Ti, Nb, V, Ca, Zr, Zn, Sn, Si, Sb or Fe, $0<w<1$, $0 \leq a \leq 1$, $0 \leq b \leq 1$, $0 \leq c \leq 1$ and $a+b+c \leq 1$), $Li_{1.2}Mn_{(0.8-a)}L_aO_2$ (L is any one of Al, Sr, Mg, Ca, Ti, V, Cr, Ni, Co, Fe, Cu, Nb, W, Zr, Zn, Sn, Sb or Si, $0 \leq a \leq 0.8$), $LiMPO_4$ (M is Fe, Co, Ni, Mn, or combinations thereof), $LiMn_{(2-x)}M_xO_4$ (M is any one of Ni, Co, Fe, Cr, V, Ti, Nb, Cu, Sn, Sb or Si, and $0 \leq x < 2$), $Li_2N_{(1-x)}M_xO_3$ (N is any one of Mn, Ni, Sn, Fe, Ru or Ir, M is any one of Ti, Mn, Sn, Sb, Ru or Te, and $0 \leq x < 1$), $Li_{(1+x)}N_{(y-z)}M_zO_2$ (N is any one of Ti or Nb, M is any one of V, Ti, Mo or W, $0 \leq x \leq 1$, $0 \leq y \leq 1$, $0 \leq z \leq 1$, and $y-z>0$), and $Li4Mn(2-x)AxO5$ (A is any one of Bi, Cr, Ir, Mo, Nb, Os, Pd, Pr, Pt, Re, Rh, Ru, Sb, Ta, V or W, and $0 \leq x < 2$).

DESCRIPTION OF EXEMPLARY
EMBODIMENTS

Hereinafter, the present invention will be described more in detail according to embodiments. However, the present invention is not limited to the following embodiments.

A secondary battery according to an embodiment of the present invention includes: a cathode including the cathode active material; an anode including an anode active material; a separator interposed between the cathode and the anode; and an electrolyte contained between the cathode and the anode.

The cathode may be manufactured by directly coating and drying a cathode on an aluminum current collector, or may be manufactured by casting the cathode active material on a separate support, stripping off the cast cathode active material from the support to obtain a film, laminating the film on the aluminum current collector.

The cathode active material may include $LiCo_2$, $LiMnO_2$, $LiNiO_2$, $LiNi_{1-x}Co_xO_2$, $LiNi_{1-x-y}Co_xM_yO_2$ (M is a trivalent metal or a transition metal), $wLi_2MnO_3 \cdot (1-w)LiNi_{1-x-y}Co_xM_yO_2$, $LiMn_{(2-x)}M_xO_4$ (M is a transition metal), $LiFePO_4$, etc., and may include all of the other cathode active materials that can be used in the lithium secondary battery.

The cathode may additionally include a conductive material and a binder.

As the conductive material which is a material used for providing an electrode with conductivity, materials can be used without special restrictions if the materials have electron conductivity without causing chemical changes. Specific examples of the conductive material may include: graphite; carbon-based materials such as carbon black, acetylene black, Ketjen black, channel black, furnace black, lamp black, thermal black, carbon fiber, and others; metal powders or metal fibers such as copper, nickel, aluminum, silver, and others; conductive whiskers such as zinc oxide, potassium titanate, and others; conductive metal oxides such as titanium oxide and others; conductive polymers such as polyphenylene derivatives and others; and others, and one or mixtures of two or more thereof may be used as the conductive material.

The binder performs a role of improving adhesive strength between cathode active material particles, or between a cathode active material and a current collector. Specific examples of the binder may include polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene-butadiene rubber, fluorine rubber, various copolymers thereof, and others, and one or mixtures of two or more thereof may be used as the binder.

In the same manner as in the cathode, the anode may be manufactured by directly coating an anode active material on a copper current collector, or casting the anode active material on a separate support, stripping off the cast anode active material from the support to obtain a film, laminating the film on the copper current collector.

The anode active material may include materials capable of performing intercalation or deintercalation of lithium. For example, the anode active material may include a lithium metal, a lithium alloy, coke, artificial graphite, natural graphite, soft carbon, hard carbon, an organic polymer compound combustion product, a carbon fiber, graphite including silicon, tin and germanium, silicon and tin, or germanium, $Li_4Ti_5O_{12}$, $TiO_2$, and others. In addition, the anode active material may include other anode active materials which can be used in a lithium secondary battery.

The separator may include all materials if the materials are usually used in a lithium secondary battery. For example, the separator may include a multilayer of two layers or more of polyethylene, polypropylene, polyvinylidene fluoride, or mixtures thereof, and a mixed multilayer such as a polyethylene/polypropylene two-layer separator, a polyethylene/polypropylene/polyethylene three-layer separator, a polypropylene/polyethylene/polypropylene three-layer separator, and the like. In addition, the separator may include all other separator materials which can be used in a lithium secondary battery.

<Comparative Example> Preparing a Comparative Electrolyte

Ethylene carbonate (EC) and ethyl methyl carbonate (EMC) were mixed to a volume ratio of 3:7. After mixing ethylene carbonate (EC) and ethyl methyl carbonate (EMC) to obtain a mixture, an 1M $LiPF_6$/EC:EMC+1 wt % FEC electrolyte was prepared by mixing the mixture with $LiPF_6$ with a concentration of 1.0 mol/L as a lithium salt.

<Example> Preparing an Electrolyte 1

Propylene carbonate (PC) and di-(2,2,2 trifluoroethyl) carbonate were mixed to a volume ratio of 3:7. After mixing propylene carbonate (PC) and di-(2,2,2 trifluoroethyl)carbonate to obtain a mixture, an 1M $LiPF_6$/PC:di-(2,2,2 trifluoroethyl)carbonate electrolyte was prepared by mixing the mixture with $LiPF_6$ with a concentration of 1.0 mol/L as a lithium salt. An 1M $LiPF_6$/PC:di-(2,2,2 trifluoroethyl)carbonate+1 wt % FEC electrolyte was prepared by adding 1 wt % FEC to the 1M $LiPF_6$/PC:di-(2,2,2 trifluoroethyl)carbonate (3:7 volume ratio) electrolyte.

<Example> Preparing an Electrolyte 2

Propylene carbonate (PC) and di-(2,2,2 trifluoroethyl) carbonate were mixed to a volume ratio of 7:3. After mixing propylene carbonate (PC) and di-(2,2,2 trifluoroethyl)carbonate to obtain a mixture, an 1M $LiPF_6$/PC:di-(2,2,2 trifluoroethyl)carbonate electrolyte was prepared by mixing the mixture with $LiPF_6$ with a concentration of 1.0 mol/L as a lithium salt. An 1M $LiPF_6$/PC:di-(2,2,2 trifluoroethyl)carbonate+1 wt % FEC electrolyte was prepared by adding 1 wt % FEC to the 1M $LiPF_6$/PC:di-(2,2,2 trifluoroethyl)carbonate (7:3 volume ratio) electrolyte.

<Example> Preparing an Electrolyte 3

Propylene carbonate (PC), methyl(2,2,2-trifluoroethyl)carbonate/FEMC, and di-2,2,2-trifluoroethylcarbonate were mixed to a volume ratio of 3:2:5. After mixing propylene carbonate (PC), methyl(2,2,2-trifluoroethyl)carbonate/FEMC, and di-2,2,2-trifluoroethylcarbonate, an 1M electrolyte comprising $LiPF_6$ containing PC, FMEC, and di-2,2,2-trifluoroethylcarbonate at a volume ratio of 3:2:5, 1 wt % of FEC, and 1 wt % of an additive was prepared by mixing $LiPF_6$ having a concentration of 1.0 mol/L as a lithium salt with the mixture, and adding 1 wt % of FEC and 1 wt % of an additive to the mixture.

<Experimental Example> Measuring Ignition Properties

After lighting an electrolyte 1 and an electrolyte 2 prepared in Example by using a torch, a self-extinguishing time (SET) ($sg^{-1}$), i.e., a second unit per weight of the electrolytes by measuring a time taken from removal of the torch to extinguishing of the electrolytes, and an average SET value was obtained by repeating the same test four times or more. Both of the electrolytes prepared in Example were measured to have 0 $sg^{-1}$ of a SET.

It is confirmed that the electrolyte according to the present invention is nonflammable since an electrolyte according to the present invention has a SET value of 0 based on criteria that the electrolyte with a SET value of less than 6 $sg^{-1}$ is nonflammable, the electrolyte with a SET value of 6 to 20 $sg^{-1}$ is flame retardant, and the electrolyte with a SET value of more than 20 $sg^{-1}$ is flammable. These criteria are in contrast to a criterion that an electrolyte of Comparative Example with a SET value of 6 $sg^{-1}$ exhibits flammability.

Figure 1:
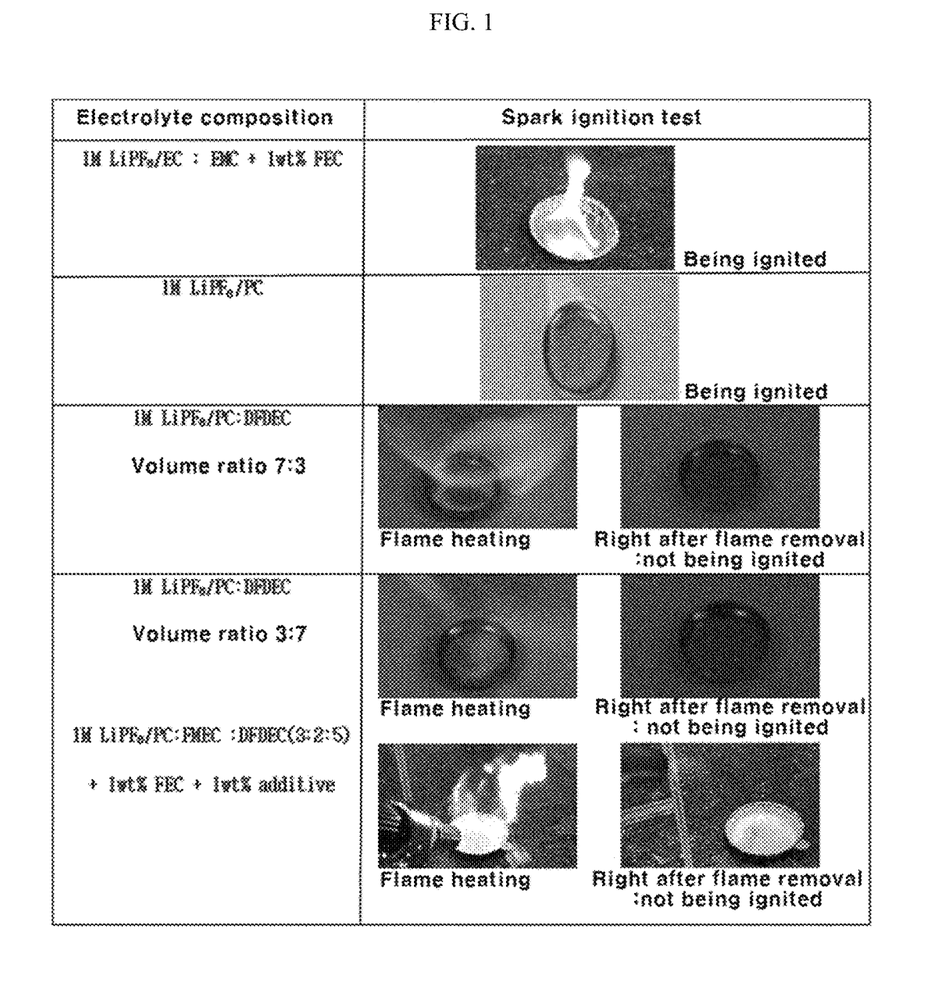
FIG. 1 illustrates measurement results after measuring noninflammabilities of electrolytes manufactured according to Examples and Comparative Example of the present invention.

As shown in FIG. 1, it can be confirmed that, while ignition occurs in a liquid electrolyte 1M LiPF6/PC comprised of only a liquid electrolyte and a PC solvent of Comparative Example, ignition does not occur in the electrolytes 1, 2 and 3 according to the present invention although an organic solvent PC is included in the electrolytes 1, 2 and 3. It is confirmed from this that the liquid electrolyte according to the present invention is nonignitable (inflammable).

<Example> Manufacturing of Batteries (Coin Cells)

After mixing a high voltage and high capacity cathode active material $Li_{1.13}Mn_{0.463}Ni_{0.23}Co_{0.203}O_2$ ($0.3Li_2MnO_3 \cdot 0.7LiMn_{1/3}Ni_{1/3}Co_{1/3}O_2$), conductive carbon black, and polyvinylidene difluoride as a binder according to a mass ratio of 96.8:2.0:1.2 to manufacture a cathode, a cathode slurry was obtained by dispersing the mixture in N-methyl-2-pyrrolidone. After uniformly applying the cathode slurry to both surfaces of an aluminum foil, a cathode plate was obtained by passing the cathode slurry applied to the aluminum foil through rolling and vacuum drying processes and welding an aluminum draw lead to the cathode slurry applied to the aluminum foil by using an ultrasonic welding machine. Thickness of the cathode plate was adjusted to 120 μm to 150 μm.

Graphite was used as an anode. After mixing graphite, conductive carbon black, and styrene butadiene rubber and carboxymethyl cellulose as a binder according to a mass ratio of 96:1:1.2:1.8 to manufacture the anode, an anode slurry was obtained by dispersing the mixture in deionized water. After applying the anode slurry to both surfaces of an aluminum foil, an anode plate was obtained by passing the anode slurry applied to the aluminum foil through rolling and vacuum drying processes and welding a nickel draw lead to the anode slurry applied to the aluminum foil by using an ultrasonic welding machine. Thickness of the anode plate was adjusted to 120 μm to 150 μm.

After putting a three-layer separator with a thickness of 20 μm between the cathode plate and the anode plate, winding a sandwich structure comprised of a cathode plate, an anode plate and a diaphragm to obtain a winding body, compressing the winding body, and injecting the compressed winding body into a rectangular aluminum metal shell, a battery was manufactured by welding each of draw leads of the cathode and anode to corresponding positions of a cover, welding the cover and metal shell into one by using a laser welding machine, and injecting an electrolyte into the cover-welded metal shell. A polypropylene/polyethylene/polypropylene three-layer structure having a thickness of 20 μm was used as a separator.

After manufacturing 2032 coil lithium cells by using a conventionally commercialized liquid electrolyte 1M $LiPF_6$/EC:EMC (a volume ratio of 3:7) according to Comparative Example of the present invention and an electrolyte 1 1M LiPF$_6$/PC:di-(2,2,2 trifluoroethyl)carbonate (a volume ratio of 3:7)+1 wt % FEC according to Example of the present invention as a liquid electrolyte, a process of comparing charge and discharge performance values of the 2032 coil lithium cells was performed.

<Example> Manufacturing of Batteries (Pouch Cells)

A commercialized NCA/LCO mixed material was used as a cathode, and graphite was used as an anode in order to manufacture a pouch cell. A pouch cell with a capacity of 850 mAh was manufactured by stacking the cathode and the anode such that a separator is disposed between the cathode and the anode.

Thus, after manufacturing pouch cells by using 1M LiPF$_6$/EC:EMC having a volume ratio of 3:7 as an existing commercialized liquid electrolyte according to Comparative Example and 1M LiPF$_6$/PC:FMEC:di-(2,2,2 trifluoroethyl)carbonate+1 wt % FEC+1 wt % additive having a volume ratio of 3:2:5 as a liquid electrolyte according to Example of the present invention, a process of comparing charge and discharge performances of the pouch cells was performed.

<Experimental Example> Measuring Battery Characteristics—Measuring Charge and Discharge Characteristics (Coin Cells)

A process of charging and discharging lithium cells (coin cells) including Li$_{1.13}$Mn$_{0.463}$Ni$_{0.203}$Co$_{0.203}$O$_2$ (0.3Li$_2$MnO$_3$.0.7LiMn$_{1/3}$Ni$_{1/3}$Co$_{1/3}$O$_2$) as a cathode active material, graphite as an anode and the liquid electrolyte was performed to 0.2 C in a voltage section of 2.0 to 4.9 V having a high charging voltage of 4.9 V.

Figure 2:
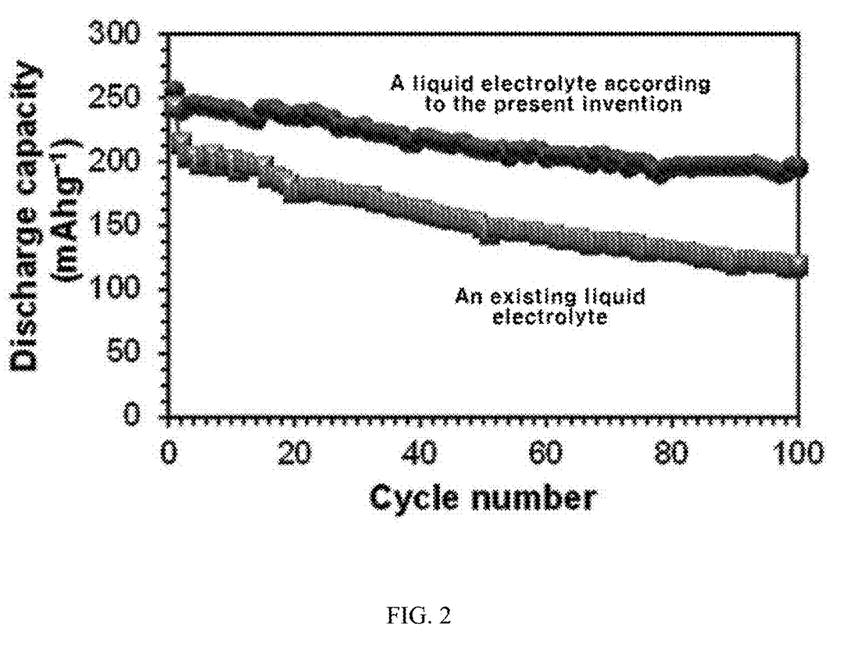
FIG. 2 illustrates measurement results after measuring electrochemical properties of batteries (coin cells) including electrolytes manufactured according to Example and Comparative Example of the present invention.

After comparatively illustrating discharge capacities per weight (specific gravimetric capacities) in a battery using the electrolyte 1 according to Example of the present invention and a battery using an existing commercialized liquid electrolyte according to Comparative Example of the present invention, comparative illustration results are shown in FIG. 2.

It can be seen that, although the charging and discharging process is performed at a 4.9 V high voltage charging condition when using an electrolyte 1 as shown in FIG. 2, the batteries not only have non-ignition (nonflammability) characteristics, but also have increased capacities and improved charge and discharge performances as seen in results of FIG. 1.

<Experimental Example> Measuring Battery Characteristics—Measuring Charge and Discharge Characteristics (Coin Cells)

A process of charging and discharging lithium cells (coin cells) including NCA/LCO as a cathode active material, graphite as an anode material, and the liquid electrolyte was performed to a charging rate of 1 C and a discharging rate of 2 C in a voltage section of 3.0 to 4.2 V.

Figure 3:
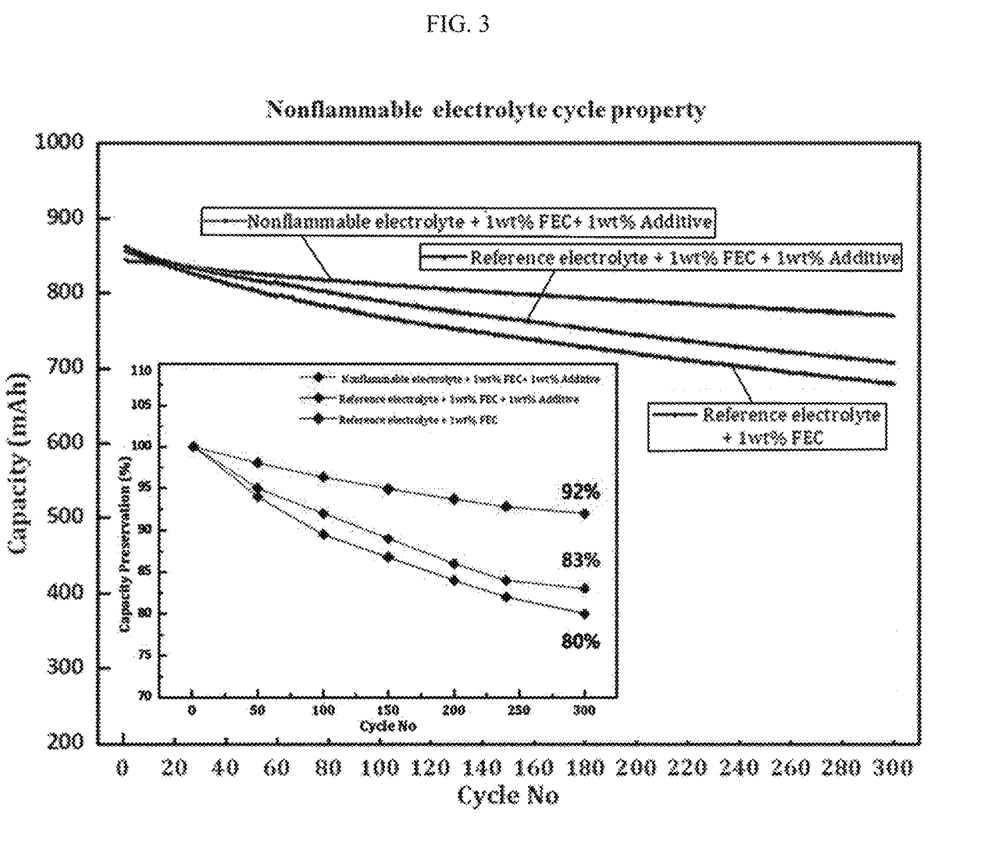
FIG. 3 illustrates measurement results after measuring electrochemical properties of batteries (pouch cells) including electrolytes manufactured according to Example and Comparative Example of the present invention.

After illustrating discharge capacities (mAh) in a battery using the electrolyte 3 according to Example of the present invention and a battery using the existing commercialized liquid electrolyte according to Comparative Example of the present invention, comparative illustration results are shown in FIG. 3.

It can be seen that, although fast discharging rate of 2 C and commercialized cathode and anode materials are used when using an electrolyte 3 as shown in FIG. 3, the batteries not only have non-ignition (nonflammability) characteristics, but also have improved lifetime characteristics compared to the existing electrolyte as seen in results of FIG. 1.

A lithium secondary battery electrolyte according to the present invention exhibits effects of increasing stability of a high voltage battery including the lithium secondary battery electrolyte and maintaining excellent charge and discharge properties of the high voltage battery by exhibiting excellent flame retardancy or noninflammability.

What is claimed is:
1. A flame retardant lithium secondary battery electrolyte comprising at least one compound of a fluoro carbonate compound represented by the following chemical formula 1 or a fluoro ester compound represented by the following chemical formula 2, and further comprising a cyclic carbonate compound represented by the following chemical formula 3, and a lithium salt including any one or mixtures of two or more selected from the group consisting of LiPF$_6$, LiClO$_4$, LiAsF$_6$, LiBF$_4$, LiSbF$_6$, LiAlO$_4$, LiAlCl$_4$, LiCF$_3$SO$_3$, LiC$_4$F$_9$SO$_3$, LiN(C$_2$F$_5$SO$_3$)$_2$, LiN(C$_2$F$_5$SO$_2$)$_2$, LiN(CF$_3$SO$_2$)$_2$, LiN(C$_x$F$_{2x+1}$SO$_2$)(C$_y$F$_{2y+1}$SO$_2$)(provided that x and y are 0 or natural number), LiCl, LiI, LiSCN, LiB(C$_2$O$_4$)$_2$, LiF$_2$BC$_2$O$_4$, LiPF$_4$(C$_2$O$_4$), LiPF$_2$(C$_2$O$_4$)$_2$, and LiP(C$_2$O$_4$)$_3$:

<Chemical Formula 1>

In chemical formula 1, R$_1$ and R$_2$ are each independently hydrogen, fluoro or CH$_x$F$_{(3-x)}$ (x is 0, 1, 2, or 3), hydrogens connected to the carbon Ca and carbon Cb can be independently substituted with fluoro, an C$_1$-C$_3$ alkyl group, or a C$_1$-C$_3$ fluoroalkyl group, and n is 1, 2, or 3, and includes at least one fluoro;

<Chemical Formula 2>

In chemical formula 2, R$_1$ is hydrogen, R$_2$ is hydrogen, fluoro or CH$_x$F$_{(3-x)}$ (x is 0, 1, 2, or 3), n of Ca is 1, hydrogens connected to the carbon Cb are each independently substituted with fluoro, an C$_1$-C$_3$ alkyl group, or a C$_1$-C$_3$ fluoroalkyl group, and n of Cb is 1, 2, or 3, and includes at least one fluoro; and <Chemical Formula 3>

In chemical formula 3, R$_1$ and R$_2$ are each independently hydrogen or a C$_1$-C$_4$ alkyl group, wherein, when the flame retardant lithium secondary battery electrolyte comprises the fluoro carbonate compound represented by the above-mentioned chemical formula 1 and the cyclic carbonate compound represented by the above-mentioned chemical formula 3, the fluoro carbonate compound represented by the above-mentioned chemical formula 1 and the cyclic carbonate compound represented by the above-mentioned chemical formula 3 are mixed at a volume ratio of 0.5:9.5 to 9.5:0.5, when the flame retardant lithium secondary battery electrolyte comprises the fluoro ester compound represented by the above-mentioned chemical formula 2 and the cyclic carbonate compound represented by the above-mentioned chemical formula 3, the fluoro ester compound represented by the above-mentioned chemical formula 2 and the cyclic carbonate compound represented by the above-mentioned chemical formula 3 are mixed at a volume ratio of 0.5:9.5 to 9.5:0.5.

2. The flame-retardant lithium secondary battery electrolyte of claim 1, wherein the fluoro carbonate compound represented by the above-mentioned chemical formula 1 is di-2,2,2-trifluoroethylcarbonate.

3. The flame-retardant lithium secondary battery electrolyte of claim 1, wherein the flame-retardant lithium secondary battery electrolyte has a discharge capacity of 170 mAhg$^{-1}$ or more after 100 charge and discharge cycles at a charge cut-off voltage of 4.3 V or more.

4. The flame-retardant lithium secondary battery electrolyte of claim 1, wherein the lithium salt has a concentration of 0.1 to 6.0 M.

5. The flame-retardant lithium secondary battery electrolyte of claim 1, wherein the lithium salt solution is mixed with the fluoro ester compound represented by the above-mentioned chemical formula 2 at a volume ratio of 20 to 80:100.

6. The flame-retardant lithium secondary battery electrolyte of claim 1, wherein the lithium salt solution is mixed with the cyclic carbonate compound represented by the above-mentioned chemical formula 3 at a volume ratio of 20 to 80:100.

7. The flame retardant lithium secondary battery electrolyte of claim 1, wherein the flame retardant lithium secondary battery electrolyte has 20 sg$^{-1}$ or less of a self-extinguishing time (SET) which means a second unit time per weight of the electrolyte taken from removal of the implement to extinguishing of the electrolyte after lighting the flame retardant lithium secondary battery electrolyte by using an implement.

8. The flame retardant lithium secondary battery electrolyte of claim 1, wherein the flame retardant lithium secondary battery electrolyte has less than 6 sg$^{-1}$ of a self-extinguishing time (SET) which means a second unit time per weight of the electrolyte taken from removal of the implement to extinguishing of the electrolyte after lighting the flame retardant lithium secondary battery electrolyte by using an implement.

9. The flame retardant lithium secondary battery electrolyte of claim 1, wherein the flame retardant lithium secondary battery electrolyte has a flash point of 150° C. or more.

10. A lithium secondary battery including the flame-retardant lithium secondary battery electrolyte of claim 1.

11. The lithium secondary battery of claim 10, wherein the lithium secondary battery has a charge cut-off voltage of 4.0 to 6.0 V.

12. The lithium secondary battery of claim 10, wherein the lithium secondary battery additionally includes any one or more cathode active materials of $LiCoO_2$, $LiNi_xCo_y$ $Mn_zL_{(1-x-y-z)}O_2$ (L is any one of Al, Sr, Mg, Ti, Nb, V, Ca, Zr, Zn, Sn, Si or Fe, $0 \leq x \leq 1$, $0 \leq y \leq 1$, $0 \leq z \leq 1$, and $x+y+z \leq 1$), $LiNi_xCo_yAl_zL_{(1-x-y-z)}O_2$ (L is any one of Al, Sr, Mg, Ti, Nb, Ca, Zr, Zn, Sn, Si or Fe, $0 \leq x \leq 1$, $0 \leq y \leq 1$, $0 \leq z \leq 1$, and $x+y+z \leq 1$), $wLi_2MnO_3 \cdot (1-w)LiMn_aNi_bCo_cL_{(1-a-b-c)}O_2$ (L is any one of Al, Sr, Mg, Ti, Nb, V, Ca, Zr, Zn, Sn, Si, Sb or Fe, $0<w<1$, $0 \leq a \leq 1$, $0 \leq b \leq 1$, $0 \leq c \leq 1$, and $a+b+c \leq 1$), $Li_{1.2}Mn_{(0.8-a)}L_aO_2$ (L is any one of Al, Sr, Mg, Ca, Ti, V, Cr, Ni, Co, Fe, Cu, Nb, W, Zr, Zn, Sn, Sb or Si, $0 \leq a \leq 0.8$), $LiMPO_4$ (M is Fe, Co, Ni, Mn, or combinations thereof), $LiMn_{(2-x)}M_xO_4$ (M is any one of Ni, Co, Fe, Cr, V, Ti, Nb, Cu, Sn, Sb or Si, and $0 \leq x < 2$), $Li_2N_{(1-x)}M_xO_3$ (N is any one of Mn, Ni, Sn, Fe, Ru or Ir, M is any one of Ti, Mn, Sn, Sb, Ru or Te, and $0 \leq x < 1$), $Li_{(1+x)}N_{(y-z)}M_zO_2$ (N is any one of Ti or Nb, M is any one of V, Ti, Mo or W, $0 \leq x \leq 1$, $0 \leq y \leq 1$, $0 \leq z \leq 1$, and $y-z>0$), and $Li_4Mn_{(2-x)}A_xO_5$ (A is any one of Bi, Cr, Ir, Mo, Nb, Os, Pd, Pr, Pt, Re, Rh, Ru, Sb, Ta, V or W, and $0 \leq x < 2$).

* * * * *